(12) United States Patent
Miller et al.

(10) Patent No.: US 7,334,469 B2
(45) Date of Patent: Feb. 26, 2008

(54) METHODS AND SYSTEMS USING RATIOMETRIC CHARACTERIZATIONS TO IMPROVE AIR DATA ACCURACY

(75) Inventors: Robert D. Miller, Apple Valley, MN (US); Steven H. Thomas, Brooklyn Center, MN (US)

(73) Assignee: Honeywell International Inc., Morristown, NJ (US)

( * ) Notice: Subject to any disclaimer, the term of this patent is extended or adjusted under 35 U.S.C. 154(b) by 324 days.

(21) Appl. No.: 11/193,645

(22) Filed: Jul. 29, 2005

(65) Prior Publication Data

US 2007/0055474 A1    Mar. 8, 2007

(51) Int. Cl.
*G01L 19/00* (2006.01)
(52) U.S. Cl. .................. 73/180; 73/170.02
(58) Field of Classification Search .......... 73/180, 73/170.02
See application file for complete search history.

(56) References Cited

U.S. PATENT DOCUMENTS

| | | | | |
|---|---|---|---|---|
| 3,135,861 A | * | 6/1964 | Burggren et al. | ........... 700/301 |
| 3,232,530 A | * | 2/1966 | Ricke et al. | ........... 235/61 NV |
| 3,239,140 A | * | 3/1966 | Armstrong | ............. 235/200 R |
| 4,718,273 A | * | 1/1988 | McCormack | ................ 73/180 |
| 6,736,213 B2 | | 5/2004 | Bussear et al. | |
| 6,928,884 B1 | | 8/2005 | Pearson | |
| 2002/0198668 A1 | | 12/2002 | Lull et al. | |
| 2004/0074311 A1 | | 4/2004 | Lull et al. | |
| 2004/0244499 A1 | | 12/2004 | Keita et al. | |
| 2005/0166986 A1 | | 8/2005 | Dell'erba et al. | |
| 2005/0167627 A1 | | 8/2005 | Lull et al. | |
| 2005/0223813 A1 | | 10/2005 | Lull et al. | |

\* cited by examiner

*Primary Examiner*—Andre J. Allen

(57) ABSTRACT

A method for characterizing pressure sensors to improve accuracy in an air data system is described where the sensors include at least one static pressure sensor and at least one total pressure sensor. The method includes characterizing the static pressure sensor and the total pressure sensor to determine a static pressure sensor error, Pse, and a total pressure sensor error, Pte, and performing a second ratiometric characterization to reference the total pressure sensor error, Pte, to the static pressure sensor error, Pse.

21 Claims, 5 Drawing Sheets

METHODS AND SYSTEMS USING RATIOMETRIC CHARACTERIZATIONS TO IMPROVE AIR DATA ACCURACY

BACKGROUND OF THE INVENTION

This invention relates generally to air data systems that are incorporated into air vehicles, and more specifically, to methods and systems for using ratiometric characterizations to improve accuracy of air data systems.

Air data parameters are important in maintaining a high quality of performance of air vehicles. Three air data parameters include altitude, velocity, and mach number.

Pressure altitude is a function of static pressure and is used to determine a quantity of flight conditions. For example, a decrease in pressure is typically indicative of an increase in altitude. Also, as pressure decreases, air density decreases. Air density is also a function of static air temperature. For example, if one plane is flying at sea level and one is flying at 10000 feet they both could be indicating 300 knots but the higher vehicle is actually flying faster. This phenomenon becomes more pronounced at higher altitudes.

Velocity is a function of impact pressure (i.e. the total pressure minus the static pressure). Velocity is the most common parameter used to control air traffic and other aircraft maneuvers. Velocity, as well as air density, is used to control fuel consumption and required power needed to fly at cruise conditions.

The mach number is the ratio of air vehicle speed and the speed of sound. As the air vehicle moves through the air, the air molecules near the air vehicle are disturbed and move around the air vehicle. If the air vehicle is moving at a relatively low speed, for example, less than 250 mph, the density of the air flow remains relatively constant.

At higher air vehicle speeds, some of the energy from the air vehicle compresses the air and locally changes a density of the air. This compressibility effect alters the amount of the resulting force on the air and becomes more important as speed increases. Near and beyond the speed of sound, about 330 meters per second or 760 mph at sea level, small disturbances in the flow are transmitted to other locations. Such disturbances have a constant entropy. For example, a sharp disturbance may generate a shock wave that could affect both the lift and drag of the air vehicle. As a result, the mach number is an important air data parameter that is used to control the performance of the air vehicle. The mach number also changes as a function of altitude.

Some air data systems, for example, those utilized in high performance aircraft are highly accurate, and thus relatively expensive. However, for lower cost air vehicles such as missiles, drones, and unmanned aerial vehicles (UAVs), accuracy of the air data system, while important, may be lessened in order to meet cost constraints that may be associated with such air vehicles. However, it is difficult to even meet moderate accuracy requirements for air data systems that incorporate low cost commercial sensors because of the sensitivity of such sensors to temperature and pressure.

BRIEF SUMMARY OF THE INVENTION

In one aspect, a method for characterizing pressure sensors to improve accuracy in an air data system is provided. The sensors include at least one static pressure sensor and at least one total pressure sensor. The method comprises characterizing the static pressure sensor and the total pressure sensor to determine a static pressure sensor error, Pse, and a total pressure sensor error, Pte, and performing a ratiometric characterization to reference the total pressure, Ptt, to the static pressure sensor error, Pse, where Ptt is the actual total pressure Pta, plus a total pressure error, Pte.

In another aspect, an air data system is provided that comprises at least one total pressure sensor, at least one static pressure sensor, and a processor. The processor is configured to receive pressures and temperatures measured by the sensors, and further configured to perform a ratiometric characterization which references a total pressure, Ptt, to a static pressure sensor error, Pse.

In still another aspect, a method for utilizing total and static pressure sensors in the determination of one or more air data parameters for an air vehicle is provided. The method comprises measuring a static pressure and a total pressure, adjusting the total pressure measurement based on a static pressure sensor error, and utilizing the referenced total pressure measurement and static pressure measurement to determine the air data parameters.

In yet another aspect, a processor is provided that is configured to characterize static pressure sensor measurements and total pressure sensor measurements to determine a static pressure sensor error, Pse, and a total pressure sensor error, Pte, as well as perform a ratiometric characterization to adjust total pressure measurements, Ptt, based on the static pressure sensor error, Pse, where Ptt is an actual total pressure, Pta, plus a total pressure error, Pte.

DETAILED DESCRIPTION OF THE INVENTION

Figure 1:
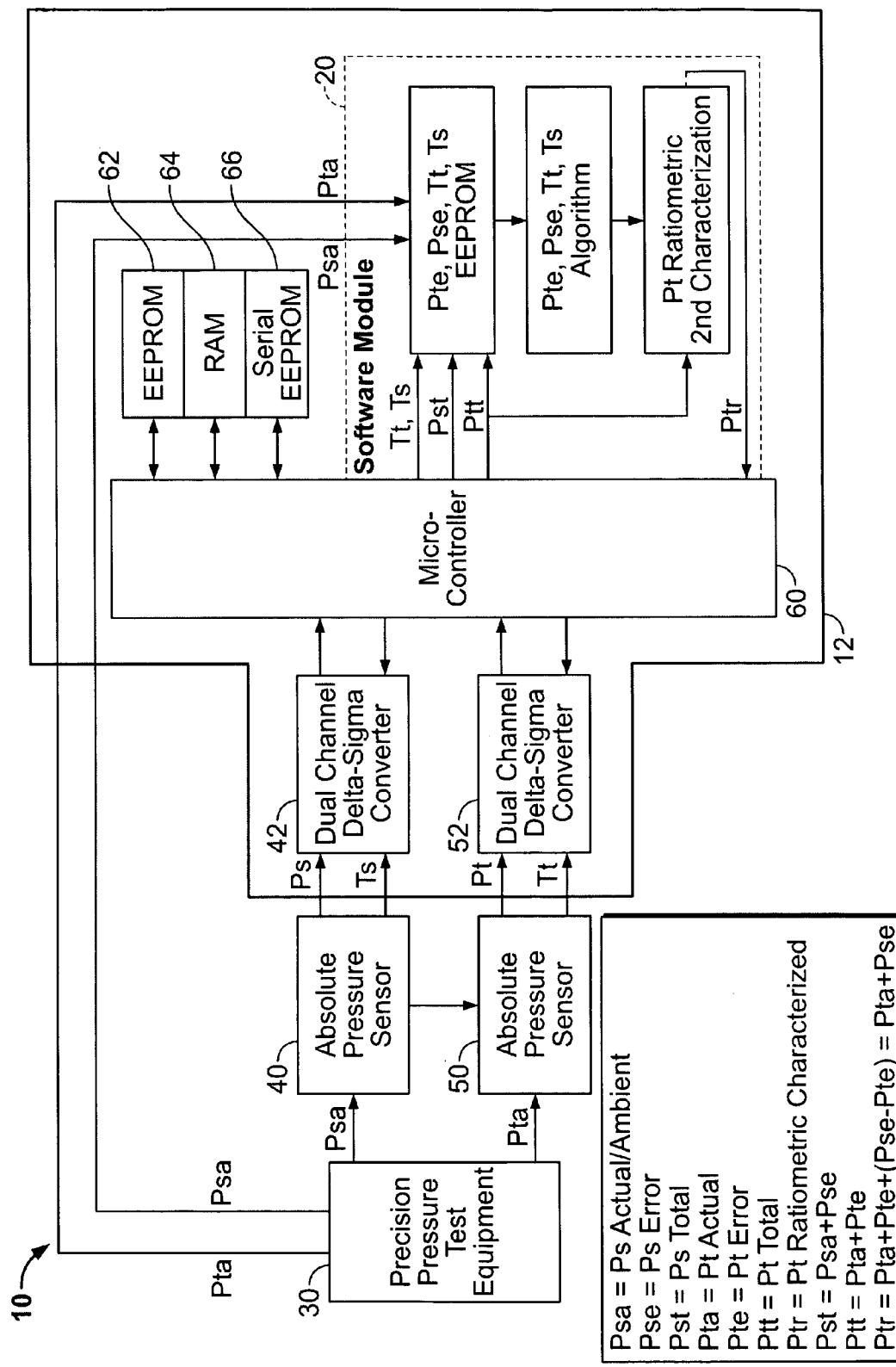
FIG. 1 is a block diagram of an air data system attached to a testing device configured to provide precision pressures to sensors of the air data system.

FIG. 1 is a block diagram illustrating a sensor characterization system 10 for testing and mechanizing an air data system including an air data computer 12. The mechanization, in part, is the utilization of a ratiometric second characterization such that errors in the total pressure are adjusted to match the errors in the static pressure such that the errors essentially are the same for each pressure (total, static). As a result, the errors cancel one another resulting in a much higher accuracy (i.e. especially at low mach numbers and velocity conditions) for air data parameters originating from the sensors.

Air data systems typically incorporate two pressure sensors. An indicated total pressure (Pti) sensor is used to measure pressure in the line-of-flight of the air vehicle, and an indicated static pressure (Ps) sensor is used to measure ambient (static) pressure. The difference between the two pressures (i.e. Pti−Psi) is the impact pressure or the pressure caused by the air vehicle as it travels through an air mass. Stated differently, the difference in the pressures is the total force per unit area exerted by air on a surface of the air vehicle. From the pressure difference, a calibrated velocity (Vc), and a true velocity (Vt) can be determined. From the pressure ratio, (i.e. Pti/Psi) a mach number (M) can be determined. If a static temperature of the air outside of the air vehicle is measured and calibrated, then a free air temperature (Tfat), an air density (σ), and a true velocity may be determined.

A large portion of the errors for M, Vc, and Vt are related to the accuracy and stability of the total and static pressure sensors along with a sophistication of the characterizations of these sensors. With regard to sensor accuracy and stability, sensors that are typically utilized in current air data systems, for example, piezo-resistive silicon sensors, are very stable as a function of time. Such sensors typically include a piezo-resisitve bridge that measure temperature at a pressure sensing bridge of the sensor. However, these sensors are not as accurate as desired for utilization in air data systems. Therefore, to utilize such sensors in air data systems, the sensors are characterized. Characterization, as used herein, is the modeling of sensors and associated electronics as a function of pressure and temperature along with the generation of a characterization algorithm. Some known characterization algorithms are complex. For example, one known characterization algorithm can contain up to 55 polynomial terms which may include sixth to ninth order polynomials.

Inaccuracies due to uncharacterized sensors can range from five percent to ten percent of the full scale pressure range. For example, if the pressure range is one to 43 in Hg (inches of mercury), then the accuracy at any given point within that range may only be ±2.1 in Hg (a 5% inaccuracy). Accuracy requirements for certain known air data systems include accuracies of less than 0.02% of full scale or ±0.0084 in Hg. This accuracy is accomplished by characterizing the sensors and their associated electronics as indicated above. For subsonic applications, the same type of pressure sensor is utilized for both the static pressure sensor and the total pressure sensor. One example of desired accuracies for the pressure measurements are: Ps±0.0084 in Hg and Pt±0.0084 in Hg. For supersonic conditions, the total pressure sensor range can be 90 in Hg or higher and the resulting 0.02% of full scale accuracy would be Pt±0.018 in Hg.

The two sensors for Pt and Ps, are typically treated as independent and as such are characterized separately. However, after characterization of the sensors, there are remaining errors, for example:

Pst=Psa+Pse, where Pst=total static pressure, Psa=actual or ambient static pressure, and Pse=static pressure error, and Ptt=Pta+Pte, where Ptt=total pressure total, Pta=actual or ambient total pressure, and Pte=total pressure error, resulting in Ptr=Pta+Pte+(Pse−Pte)=Pta+Pse, where Ptr=Ptt, and is ratiometric characterized.

For a pressure range of 1 to 43 in Hg, for static pressure, Ps, and total pressure, Pt, the maximum and minimum error tolerances, 0.02% of full scale, are:

$$Pst = Psa \pm 0.0084 \text{ in Hg, and } Ptt = Pta \pm 0.0084 \text{ in Hg.}$$

$$\text{For Mach} = M = 2.236068\left[\left(\frac{Pt}{Ps}\right)^{0.2857142} - 1\right]^{0.5} \text{ the worst case error is:}$$

$$\text{Mach} = M = 2.236068\left[\left(\frac{Pt + .0084}{Ps - .0084}\right)^{0.2857142} - 1\right]^{0.5}$$

For calibrated Airspeed (CAS or Vc):

$$CAS = Vc = a_O\left[5\left\{\left(\frac{Pt - Ps}{Pso} + 1\right)^{\frac{2}{7}} - 1\right\}\right]^{0.5}$$

and the worst case error is:

$$CAS = Vc = a_O\left[5\left\{\left(\frac{(Pt + .0084) - (Ps - .0084)}{Pso} + 1\right)^{\frac{2}{7}} - 1\right\}\right]^{0.5}$$

where; $a_o$ is the constant for the speed of sound at sea level and Pso is a standard day static pressure constant.

For true Airspeed:

True Airspeed=TAS=Vt=38.96785×M×SAT$^{0.5}$, and the worst case error for true airspeed reflects the worst case mach number above. SAT, sometimes referred to as Tfat, is an ambient air temperature of the free undisturbed volume of air around the vehicle. The SAT parameter requires separate sensing and characterization with respect to the mach number parameter noted above and is not equivalent to the temperature at the bridge of the pressure sensing element. In one embodiment, SAT is in Kelvin and is determined by using a total air temperature sensor, typically co-located with the total pressure sensor.

Static pressure and total pressure errors are typically independent, and as such, worst case errors or even RMS errors are used to determine compliance to air data specifications. However, if the errors of static pressure and total pressure were not independent, for example, such that total pressure errors would be in the same direction and amount as static pressure errors, then any resulting errors for the mach number (M), the calibrated velocity (Vc), and the true velocity (Vt) would balance out. This balancing out is reflected in the ratiometric total pressure (Ptr) term shown in FIG. 1. Balancing out of the errors for M, Vc, and Vt can be done by conducting a second ratiometric characterization where Pte is referenced to Pse and Pse is unchanged. The barometric altitude is proportional to static pressure and therefore, the Pst accuracy is to be maintained.

As illustrated in FIG. 1, to implement a ratiometric second characterization of the pressure sensors, an algorithm is included within software module 20 of air data computer 12. In one embodiment, the algorithm is executed during characterization of the sensors, the sensors being interface to test equipment which provides accurate pressure and temperature inputs to these sensors.

Referring specifically to FIG. 1, sensor characterization system 10 includes an air data computer 12 that includes a software module 20 that provides the above described second characterization. System 10 further includes precision pressure test equipment 30 capable of applying various accurate pressures to the pressure sensors for the air data system. More specifically, an absolute static pressure sensor 40 receives an actual static pressure (Psa) from precision pressure test equipment 30, and outputs a static pressure (Ps) and a static temperature (Ts) to a dual channel delta sigma converter 42. An absolute total pressure sensor 50 receives an actual total pressure (Pta) from precision pressure test equipment 30, and outputs a total pressure (Pt) and a total temperature (Tt) to a dual channel delta sigma converter 52.

Delta sigma converters 42 and 52 are interfaced to microcontroller 60 which is further configured with software module 20. In an alternative embodiment, delta sigma converters 42 and 52 are incorporated within microcontroller 60. In either embodiment, delta sigma converters 42 and 52 are configured to convert pressure and temperature data from static pressure sensor 40 and total pressure sensor 50 into a format to be received by microcontroller 60. Also interfaced to microcontroller 60, in the embodiment illustrated, are EEPROM 62, RAM 64, and serial EEPROM 66.

The total pressure and static pressure error terms (Pte and Pse respectively) are generated via a first characterization within software module 20. The first characterization includes varying temperature and pressure combinations using precision pressure test equipment 30 (i.e., for example, twenty different pressures and at each pressure, ten different temperature settings).

To perform the first characterization as described above, pressures and temperatures from each sensor 40 and 50, each of which includes a thermal bridge, are stored by microcontroller 60, for example, in RAM 64 or EEPROM 62. By comparing the input settings Psa and Pta from pressure test equipment 30 with the first characterization results Pst and Ptt, as calculated by microcontroller 60, a matrix of total pressure and static pressure error terms (Pte and Pse respectively) can be generated as a function of pressure and temperature and then stored in memory.

Figure 2:
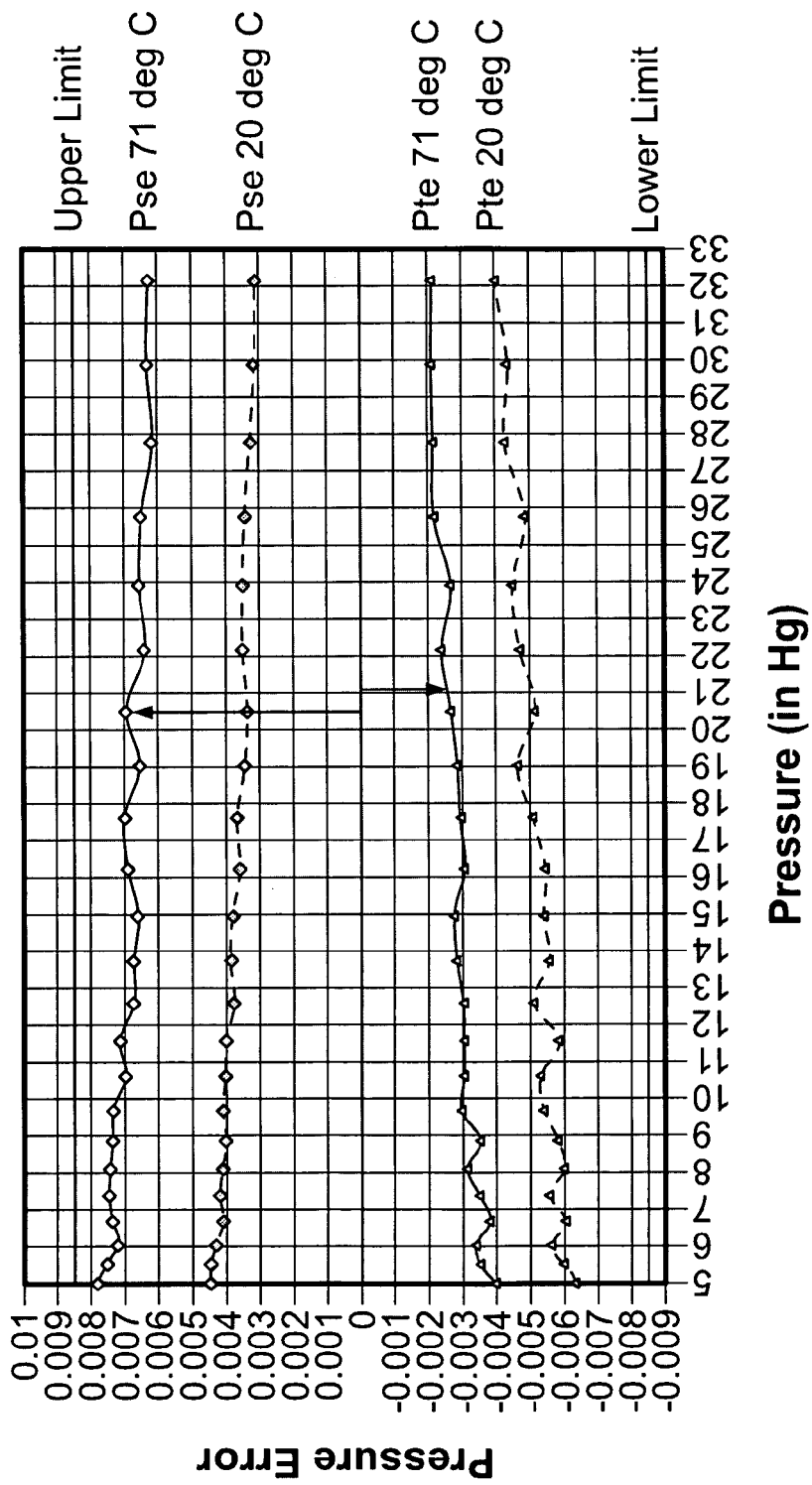
FIG. 2 is a chart illustrating total pressure and static pressure errors as a function of pressure and temperature after an initial sensor characterization.

With the Pse and Pte error terms matrix having been calculated, an algorithm can be derived that provides a continuous plot of the Pse and Pte error terms as a function of both pressure and temperature. FIG. 2 is an example plot of total pressure and static pressure error terms (Pte and Pse respectively) as a function of pressure and temperature. More specifically, a ratiometric second characterization algorithm can be implemented to transition Ptt (total pressure including the total pressure error) to Ptr (the ratiometric characterized total pressure). Ptr now contains the static pressure error, Pse. As an example, it is assumed that the initial characterization has been conducted and stored within one of the memories 62, 64, and 66 interfaced with microcontroller 60 within air data computer 12. FIG. 2 shows error plots (Pse and Pte) at a specific temperature and are stored, for example, in EEPROM 62.

A ratiometric second characterization conducted, for example, at a 10,000 foot altitude, a speed (mach number) of Mach 0.2, and at a 71° C. temperature as measured from the sensor temperature bridge, results in an ambient static pressure (Psa) of 20.576985 in Hg (due to altitude), and ambient total pressure (Pta) of 21.1589257 in Hg (due to the mach number and altitude).

At this temperature and at these pressures, a static pressure error (Pse) of 0.007 in Hg and a total pressure error (Pte) of −0.0025 in Hg are calculated. As a result, Ptr can be calculated:

$Pst=Psa+Pse=Psa+0.007$ $Ptt=Pta+Pte=Pta-0.0025$ $Ptr=Pta+Pte+(Pse-Pte)=Pta+0.007.$

The result is that since the errors for Pst and Ptr are the same, they cancel one another out when determining the mach number (M), the calibrated velocity (Vc), and the true velocity (Vt).

Figure 3:
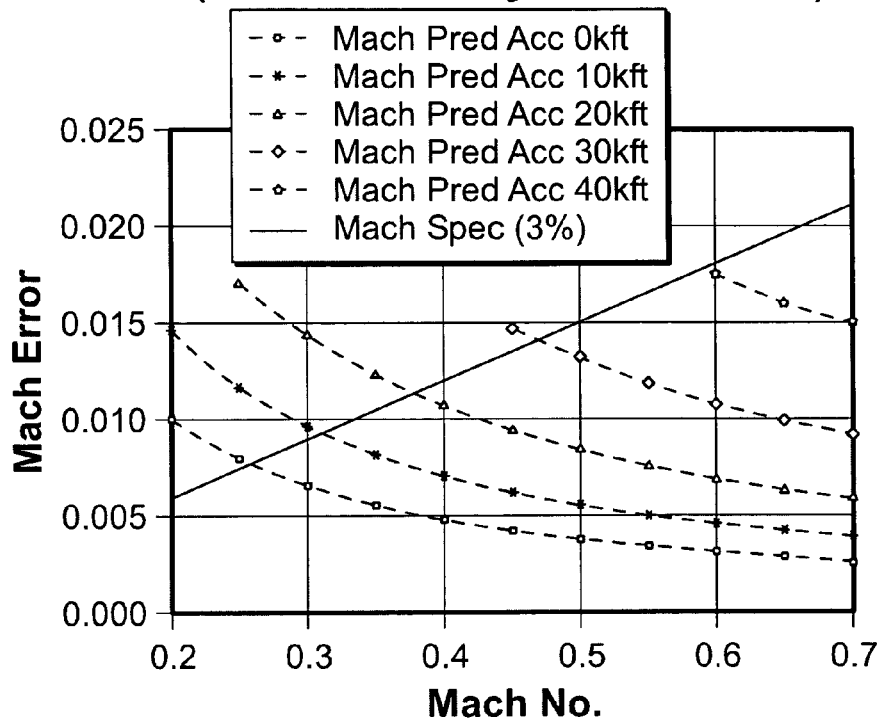
FIG. 3 is a plot illustrating mach number error against mach number.
Figure 4:
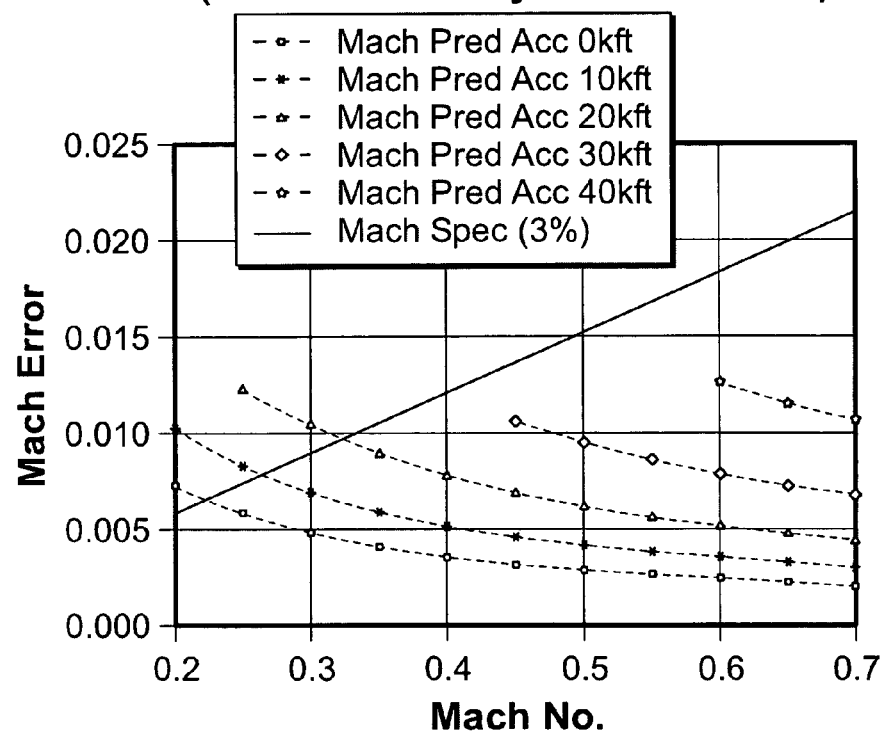
FIG. 4 is a plot illustrating the mach number error against the mach number in RMS.
Figure 5:
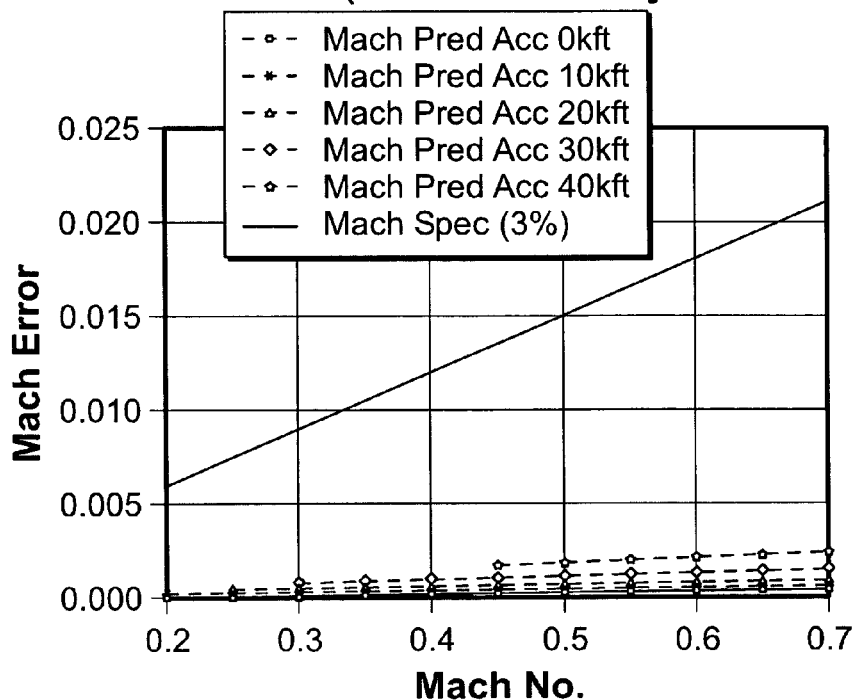
FIG. 5 is a chart illustrating a reduction in mach number error after a ratiometric second characterization process.

A series of simulation plots are shown in FIGS. 3-7 for the mach number and the calibrated velocity. Referring to FIG. 3, it is illustrated how the mach error decreases as the mach number increases. FIG. 4 show the mach error against the mach number plotted in RMS. FIGS. 3 and 4 further illustrate problems at low mach numbers in meeting the accuracy requirements. FIG. 5 is a chart illustrating the reduction in mach number error after the ratiometric second characterization process described above has been applied, and illustrates the benefits thereof.

Figure 6:
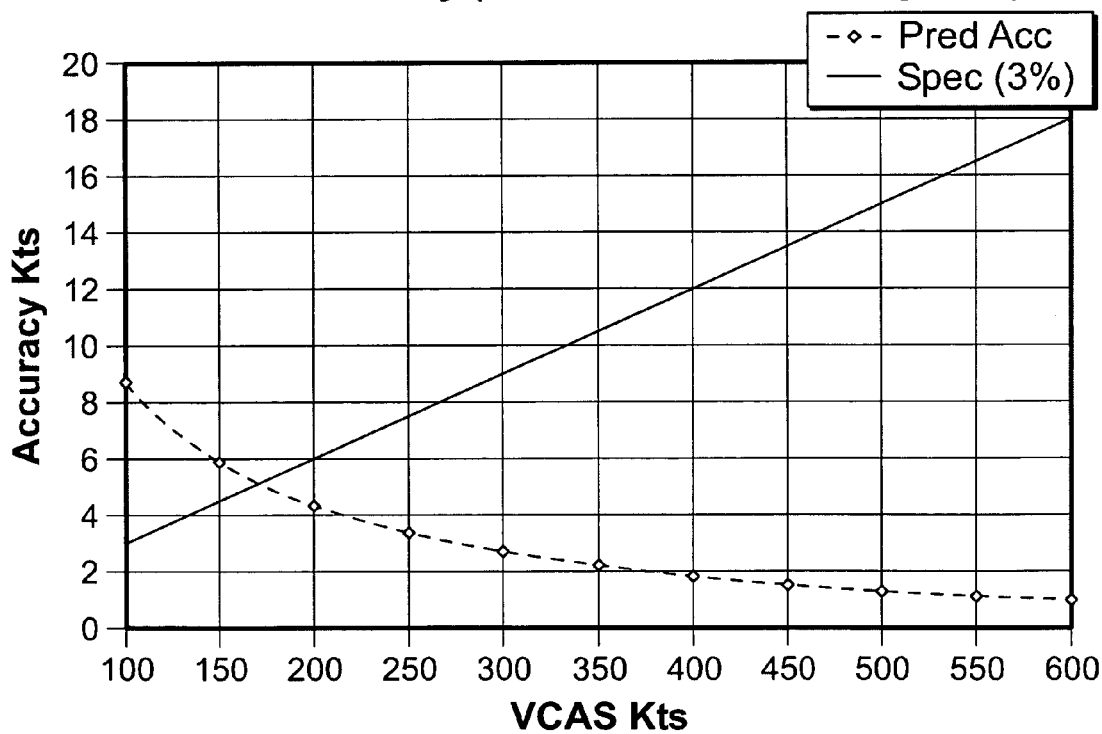
FIG. 6 is a chart illustrating accuracy of a calibrated velocity over a range of velocities.
Figure 7:
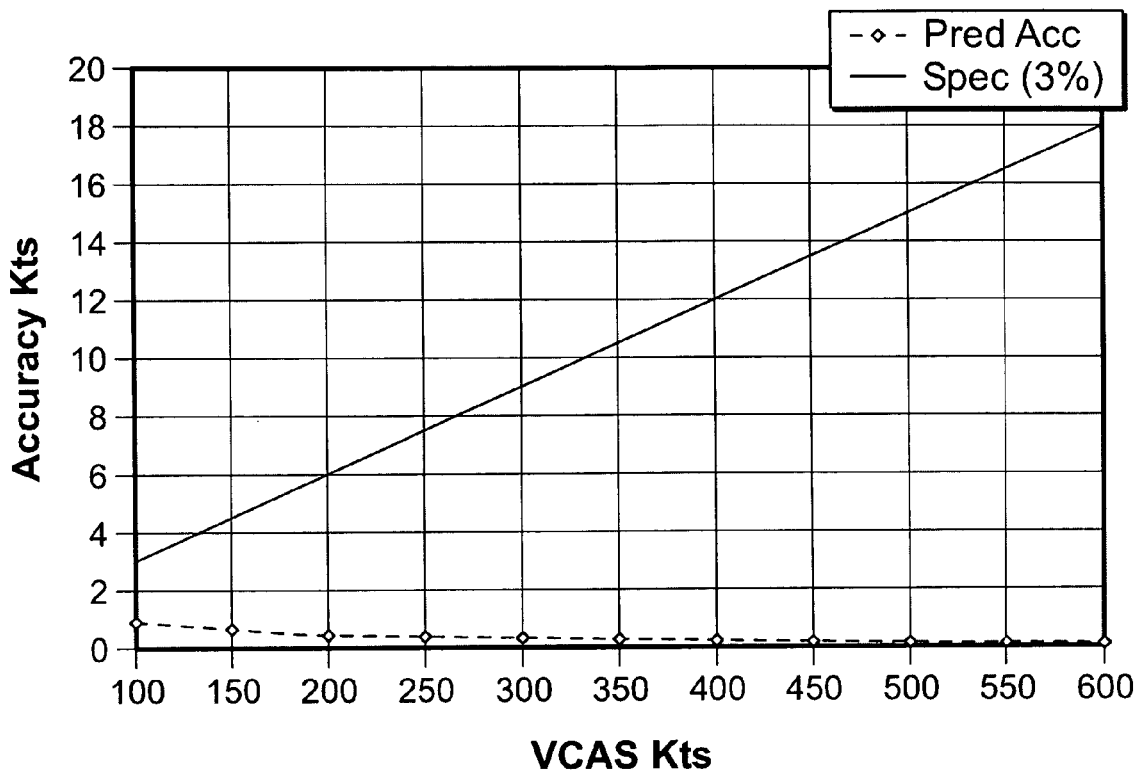
FIG. 7 is a chart illustrating the improvement in the accuracy of the calibrated velocity after a ratiometric second characterization process is applied.

FIG. 6 is a chart illustrating that the accuracy of the calibrated velocity, Vc, increases as velocity increases and that the error is relatively large at low speeds. FIG. 7 is a chart illustrating the improvement in the accuracy of the calibrated velocity after the ratiometric second characterization is applied. Again, significant accuracy improvement in the calibrated velocity, Vc, is obtained.

Figure 8:
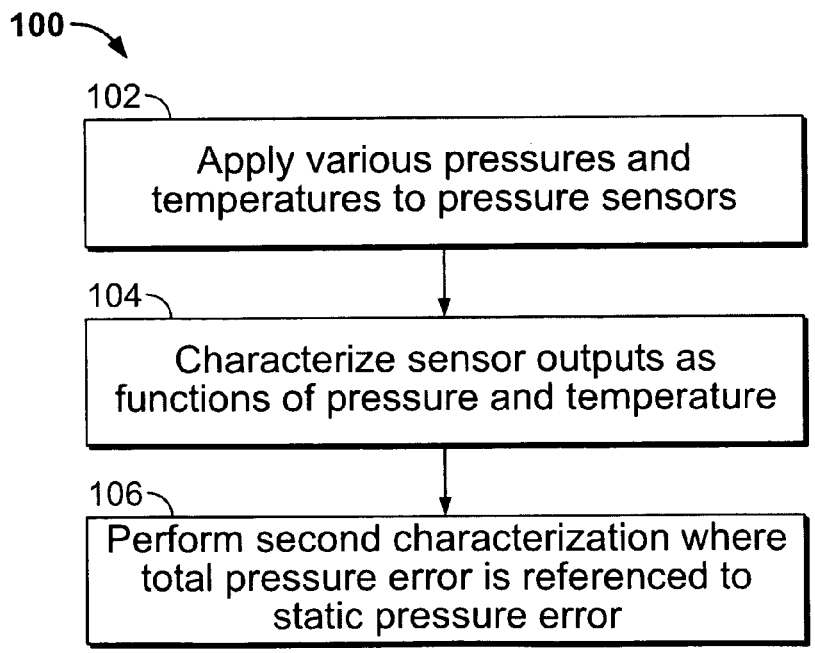
FIG. 8 is a flowchart illustrating a process for characterizing pressure sensor errors.

FIG. 8 is a flowchart 100 illustrating the above described ratiometric characterization process. For a set of pressure sensors coupled to an air data computer, various pressures and temperatures are applied 102 to the pressure sensors and the resulting pressure and temperature readings (e.g. sensor outputs) are stored in memory of the air data computer 12. The sensors are then characterized 104 as functions of pressure and temperature and the characterizations are stored in memory of the air data computer 12. A second characterization is then performed 106, where a total pressure error resulting from the characterization 104 is referenced to a static pressure error resulting from the characterization 104 and described as a ratiometric total pressure according to:

$Ptr=Pta+Pte+(Pse-Pte)=Pta+Pse.$

For high performance air data systems, a ratiometric second characterization of the static and total pressure sensors result in mach number and velocity measurements improve significantly and enable meeting much tighter accuracy requirements. For low cost systems, lower accuracy/lower cost commercial sensors can be used and a ratiometric second characterization provides that moderate accuracy requirements can be met which allows for more tolerance for drift over lifetime, for example, while in long term storage environments.

While the invention has been described in terms of various specific embodiments, those skilled in the art will recognize that the invention can be practiced with modification within the spirit and scope of the claims.

What is claimed is:

1. A method for characterizing pressure sensors to improve accuracy in an air data system, the sensors including at least one static pressure sensor and at least one total pressure sensor, said method comprising:

characterizing the static pressure sensor and the total pressure sensor to determine a static pressure sensor error, Pse, and a total pressure sensor error, Pte; and performing a ratiometric characterization to reference the total pressure, Ptt, to the static pressure sensor error, Pse, where Ptt is the actual total pressure Pta, plus a total pressure error, Pte.

2. A method according to claim 1 wherein independently characterizing comprises varying pressures and temperatures applied to the sensors.

3. A method according to claim 2 further comprising storing the temperature and pressure data provided by the sensors.

4. A method according to claim 1 wherein independently characterizing the static pressure sensor and the total pressure sensor comprises:
applying a plurality of pressures at a plurality of temperatures to the static pressure sensor and the total pressure sensor; and
characterizing outputs of the static pressure sensor and the total pressure sensor as functions of pressure and temperature.

5. A method according to claim 1 wherein performing a ratiometric characterization comprises characterizing a total pressure according to:
Ptr=Pta+Pte+(Pse−Pte)=Pta+Pse where Ptr is the ratiometrically characterized total pressure, Pta is the actual total pressure reading, Pte is the total pressure error, and Pse is the static pressure error.

6. A method according to claim 1 wherein performing a ratiometric characterization comprises referencing the total pressure sensor error, Pte, to the static pressure sensor error, Pse.

7. An air data system comprising:
at least one total pressure sensor;
at least one static pressure sensor; and
a processor configured to receive pressures and temperatures measured by said sensors, said processor configured to perform a ratiometric characterization which references a total pressure measurement, Ptt, to a static pressure sensor error, Pse.

8. An air data system according to claim 7 wherein to reference a total pressure, Ptt, to a static pressure sensor error, Pse, said processor is configured to reference a total pressure sensor error, Pte, to the static pressure sensor error, Pse.

9. An air data system according to claim 7 wherein said system comprises a memory, said memory configured to store measurements relating to a plurality of pressures at a plurality of temperatures applied to the static pressure sensor and the total pressure sensor, said processor configured to characterize the stored measurements as functions of pressure and temperature.

10. An air data system according to claim 7 wherein said processor is configured to characterize a total pressure according to:
Ptr=Pta+Pte+(Pse−Pte)=Pta+Pse where Ptr is the ratiometrically characterized total pressure, Pta is the actual total pressure reading, Pte is the total pressure error, and Pse is the static pressure error.

11. A method for utilizing total and static pressure sensors in the determination of one or more air data parameters for an air vehicle, said method comprising:
measuring a static pressure and a total pressure;
adjusting the total pressure measurement based on a static pressure sensor error; and
utilizing the referenced total pressure measurement and static pressure measurement to determine the air data parameters.

12. A method according to claim 11 wherein the air data parameters include one or more of a mach number, a velocity, and an altitude.

13. A method according to claim 11 wherein adjusting the total pressure measurement based on a static pressure sensor error comprises:
independently characterizing the static pressure sensor and the total pressure sensor to determine a static pressure sensor error, Pse, and a total pressure sensor error, Pte; and
performing a ratiometric characterization to reference the total pressure, Ptt, to the static pressure sensor error, Pse, where Ptt is the actual total pressure Pta, plus a total pressure error, Pte.

14. A method according to claim 13 wherein independently characterizing comprises varying pressures and temperatures applied to the sensors.

15. A method according to claim 13 wherein independently characterizing the static pressure sensor and the total pressure sensor comprises:
applying a plurality of pressures at a plurality of temperatures to the static pressure sensor and the total pressure sensor; and
characterizing outputs of the static pressure sensor and the total pressure sensor as functions of pressure and temperature.

16. A method according to claim 11 wherein adjusting the total pressure measurement based on a static pressure sensor error comprises characterizing a total pressure according to:
Ptr=Pta+Pte+(Pse−Pte)=Pta+Pse where Ptr is the ratiometrically characterized total pressure, Pta is the actual total pressure reading, Pte is the total pressure error, and Pse is the static pressure error.

17. A method according to claim 1 wherein 11 wherein adjusting the total pressure measurement based on a static pressure sensor error comprises referencing the total pressure sensor error, Pte, to the static pressure sensor error, Pse.

18. A processor configured to:
characterize static pressure sensor measurements and total pressure sensor measurements to determine a static pressure sensor error, Pse, and a total pressure sensor error, Pte; and
perform a ratiometric characterization which adjusts total pressure measurements, Ptt, based on the static pressure sensor error, Pse, where Ptt is an actual total pressure Pta, plus a total pressure error, Pte.

19. A processor according to claim 18 further configured to characterize static pressure sensor measurements and total pressure sensor measurements as functions of pressure and temperature.

20. A processor according to claim 18 further configured to characterize total pressure measurements according to:
Ptr=Pta+Pte+(Pse−Pte)=Pta+Pse where Ptr is the ratiometrically characterized total pressure, Pta is the actual total pressure reading, Pte is the total pressure error, and Pse is the static pressure error.

21. A processor according to claim 18 further configured to reference total pressure sensor errors to static pressure sensor errors.

* * * * *